United States Patent
Uesugi

(10) Patent No.: US 6,726,297 B1
(45) Date of Patent: Apr. 27, 2004

(54) OFDMA SIGNAL TRANSMISSION APPARATUS AND METHOD

(75) Inventor: Mitsuru Uesugi, Yokosuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/462,491

(22) PCT Filed: May 28, 1999

(86) PCT No.: PCT/JP99/02866

§ 371 (c)(1),
(2), (4) Date: Jan. 20, 2000

(87) PCT Pub. No.: WO99/63691

PCT Pub. Date: Dec. 9, 1999

(30) Foreign Application Priority Data

Jun. 2, 1998 (JP) .......................................... 10-153214

(51) Int. Cl.⁷ ............................................... H04J 11/00
(52) U.S. Cl. ....................................... 375/260; 370/210
(58) Field of Search ................................. 370/203, 204, 370/206, 210; 375/130, 137, 135, 136, 259, 760, 377

(56) References Cited

U.S. PATENT DOCUMENTS

| | | | | |
|---|---|---|---|---|
| 5,548,582 A | * | 8/1996 | Brajal et al. | 370/206 |
| 5,680,388 A | * | 10/1997 | Kahre | 370/210 |
| 5,914,931 A | * | 6/1999 | Kang et al. | 370/203 |
| 6,005,840 A | * | 12/1999 | Awater et al. | 370/206 |
| 6,009,073 A | * | 12/1999 | Kaneko | 370/203 |

FOREIGN PATENT DOCUMENTS

| | | | |
|---|---|---|---|
| JP | 7-183862 | 7/1995 | |
| JP | 8-88617 | 4/1996 | |
| JP | 8-237219 | 9/1996 | |
| JP | 8316932 | 11/1996 | |
| JP | 9-266466 | * 10/1997 | ............. H04J/1/00 |
| JP | 10-66039 | 3/1998 | |

OTHER PUBLICATIONS

English Language Translation of relevant portion for JP Appln. No. 8–316932.
English Language Abstract of JP Appln. No. 8–88617.
English Language Abstract of JP Appln. No. 10–66039.
English language abstract of JP 8–237219.

\* cited by examiner

Primary Examiner—Temesghen Ghebretinsae
Assistant Examiner—Kevin M Burd
(74) Attorney, Agent, or Firm—Greenblum & Bernstein, P.L.C.

(57) ABSTRACT

In a transmission section, which performs an OFDMA signal transmission, a plurality of serial signals is converted to parallel signals by a plurality of serial/parallel converters, the plurality of converted parallel signals are rearranged at intervals of a power of 2 by a rearranging apparatus, sub-carrier assignment is performed, and inverse Fourier transform is performed with respect to the number of sub-carriers, which has been varied depending on the number of rearranged parallel signals, so as to be changed to time waveforms. The transformed parallel signals are converted to serial signals by the parallel/serial converter, the converted serial signals are converted to analog signals by D/A converter and orthogonal modulator, thereafter converting the analog signals to high frequency signals so as to be emitted. This configuration allows the amount of operations and power consumption to be reduced.

15 Claims, 16 Drawing Sheets

OFDMA SIGNAL TRANSMISSION APPARATUS AND METHOD

TECHNICAL FIELD

The present invention relates to an OFDMA (Orthogonal Frequency Division Multiple Access) signal transmission apparatus and its method.

BACKGROUND ART

In mobile communications, overcoming multipath fading and improving transmission quality have been conventionally present as problems to be solved. In connection with the multipath fading, there is a ii multi-carrier transmission as one of measures to transmit data with a good quality without lowering a symbol rate.

OFDM (Orthogonal Frequency Division Multiplexing) is one of multi-carrier transmission systems, that is, one that sets a distance between adjacent sub-carriers to 1/symbol rate to allow the distance between the sub-carriers to be narrowed at the maximum.

Also, OFDMA is a system in which a plurality of users performs multiple access using OFDM. In the conventional OFDMA data transmission apparatus, there is proposed a method in which frequency division and time division are carried out when multiple access is performed. Also, it has been considered that diversity is carried out in a frequency direction and a time direction to make it possible to improve an error correction capability.

FIG. 1 is a block diagram showing the configuration of a transmission section in the conventional OFDMA signal transmission apparatus. FIG. 2 is a block diagram showing the configuration of a reception section in the conventional OFDMA signal transmission apparatus.

A transmission section 10 shown in FIG. 1 mainly comprises S/P (Serial/Parallel) converter 11, IFFT (Inverse Fast Fourier Transform) apparatus 12, P/S (Parallel/Serial) converter 13, a D/A (Digital/Analog) converter and orthogonal modulator 14, a transmission amplifier 15, and a transmission antenna 16.

A reception section 60 shown in FIG. 2 mainly comprises reception antenna 61, quasi-coherent detector and A/D (Analog/Digital) converter 62, S/P converter 63, FFT (Fast Fourier Transform) apparatus 64, and P/S converter 65.

An explanation will be given of the operation of the conventional OFDM transmission and reception in the OFDMA signal transmission apparatus having the above-configured transmission section 10 and reception section 60. In this case, it is assumed that transmission section 10 and reception section 60 are provided in the base station of the mobile communication system (not shown) and the mobile station.

First, an explanation will be given of the operation, which is performed when forward signals are transmitted to the mobile station from the base station. In the case of the forward OFDMA, the base station performs the same operation as the case in which the sub-carriers are present in all bands of OFDM no matter how the sub-carrier is assigned to each mobile station.

Transmission data shown in FIG. 1 is data with respect to each mobile station, and transmission data is input to S/P converter 11 simultaneously, and converted in parallel. If the number of sub-carriers is N, N complex number values are set after conversion.

Here, 0 is placed at extra sub-carriers. The result is changed to time-waveform by performing Fourier transform of sub-carriers N by IFFT apparatus 12. Then, time series of sub-carriers N are arranged in order of time by P/S converter 13. Then, the result is converted to analog waveform, and orthogonally modulated by D/A converter and orthogonal modulator 14, thereafter converting the analog waveform to high frequency. Then, the resultant signals are amplified by transmission amplifier 15, and the amplified signals are emitted from transmission antenna 16.

On the other hand, in the mobile station, the emitted signals are received by the reception antenna 61 shown in FIG. 2 and the received signals are demodulated by quasi-coherent detector and A/D converter 62, thereafter converting the demodulated signals to digital values by S/P converter 63. Then, the converted signals are converted to parallel signals every N sample, thereafter the parallel signals are Fourier transformed to signals on a frequency axis by FFT apparatus 64. Moreover, the converted signals are converted to serial signals by P/S converter 65 so as to obtain received data.

Thus, since all sub-carriers are completely orthogonal to the forward signals, signals can be transmitted in a state that interference between the respective signals little occurs.

Next, an explanation will be given of the operation, which is performed when reverse signals are transmitted to the base station from the mobile station. In the case of the reverse OFDMA, as a method of multiple access, there are a method in which the sub-carriers are divided and a method in which time division is carried out using sub-carriers, or a method, which mixes the above two methods.

In the case of the method in which time division is carried out using all sub-carriers, the same operation as that of the case of forward signals is used, and only ON/OFF of transmission is added thereto.

The method in which the sub-carriers are divided will be explained. A certain mobile station is assumed. The mobile station converts transmission data to parallel data using S/P converter 11. If the number of sub-carriers assigned to the mobile station is N, N complex number values are set after conversion.

Data is changed to time-waveform by performing Fourier transform of sub-carriers N by IFFT apparatus 12. Then, time series of sub-carriers N are arranged in order of time by P/S converter 13. Then, data is converted to analog waveform, and orthogonally modulated by D/A converter and orthogonal modulator 14, thereafter converting the analog waveform to high frequency. Then, the resultant signals are amplified by transmission amplifier 15, and the amplified signals are emitted from transmission antenna 16.

The base station receives signals each having a different sub-carrier from a plurality of mobile stations. Synthetic signals of signals emitted from the plurality of mobile stations are received through the reception antenna 61, and the received signals are demodulated by quasi-coherent detector and A/D converter 62, thereafter converting the demodulated signals to digital values. Then, the converted signals are converted to parallel signals every N sample by S/P converter 63, thereafter the parallel signals are Fourier transformed to signals on a frequency axis by FFT apparatus 64. Moreover, the converted signals are converted to serial signals by P/S converter 65 so as to obtain received data.

In the reverse signals, if frequency offset is present every mobile station and maximum Doppler frequency is different, all sub-carriers are not completely orthogonal to the reverse signals. However, if these influences, which are exerted upon the symbol rate, are small, signals can be transmitted in a state that interference between the respective signals little occurs.

However, in the conventional OFDMA signal transmission apparatus, the following problems are present.

First, in the case of receiving the forward signals, since the sub-carriers can be separated only after FFT has been carried out, not only the sub-carriers assigned to the station but also the sub-carriers of all OFDM bands must be demodulated in the mobile station. For this reason, even if a traffic volume is low, the number of A/D converters and that of FFT apparatuses, which are the same as that of sub-carriers, must be provided. This increases in the circuit scale and power consumption.

Also, since the signals of all OFDM users (all mobile stations) are synthesized and the synthesized signals are amplified by the transmission amplifier in the base station, the dynamic range is large and it is difficult to restrain nonlinear distortion.

Moreover, since AFC (Automatic Frequency Control) is provided to only all OFDMA bands in the base station, deterioration in the quality of signals increases when the frequency offset differs depending on each mobile station or the maximum Doppler frequency is large.

DISCLOSURE OF INVENTION

A first object of the present invention is to provide an OFDMA signal transmission apparatus, which can reduce the amount of operations and power consumption, and its method.

This object can be achieved by converting a plurality of serial signals to parallel signals, arranging the plurality of converted serial signals at intervals of a power of 2 to perform sub-carrier assignment, and performing inverse Fourier transform to the number of sub-carriers, which has been varied depending on the number of rearranged parallel signals, to be transformed to time waveforms in the transmission section, which performs an OFDMA signal transmission.

A second object of the present invention is to provide an OFDMA signal transmission apparatus, which can restrain nonlinear distortion even if a transmission amplifier with a small dynamic range is used in a base station, and its method.

This object can be achieved by converting serial signals of the respective sequences to parallel signals, performing inverse Fourier transform with respect to the number of sub-carriers, which has been varied depending on the number of rearranged parallel signals, to be transformed to time waveforms, and converting the parallel signals to serial signals in the transmission section, which performs an OFDMA signal transmission.

A third object of the present invention is that high quality reception can be carried out even if frequency offset is different depending on each mobile station and maximum Doppler frequency is large in the base station.

This object can be achieved by making the frequency bands of the signals transmitted from the respective mobile stations different from each other, dividing received signals converted to digital signals for each frequency band, converting the signals to base band signals for the respective bands, limiting the signals, converting the limited signals to parallel signals, performing Fourier transform with respect to the signals, and converting the parallel signals to serial signals.

BEST MODE FOR CARRYING OUT THE INVENTION

Embodiments of the present invention will be described with reference to the accompanying drawings herewith.

First Embodiment

Figure 1:
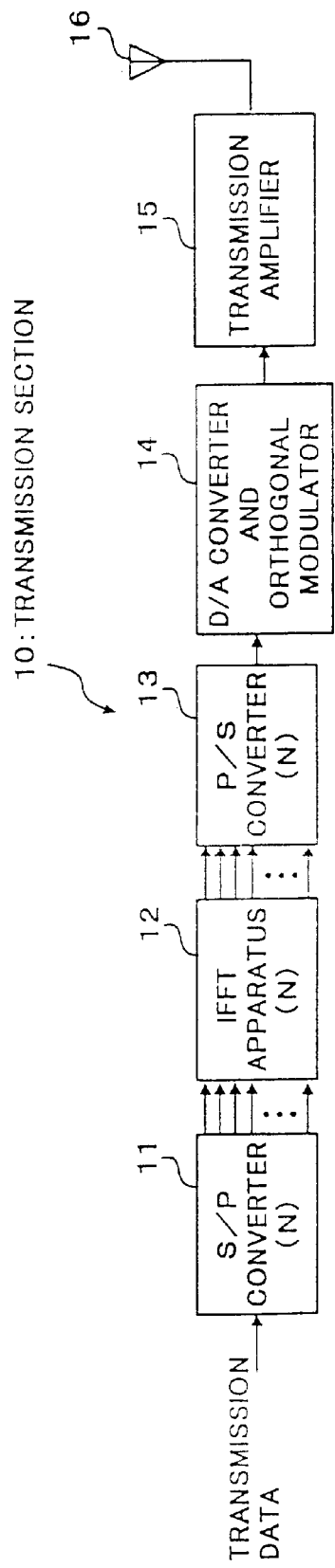
FIG. 1 is a block diagram showing a transmission section in a conventional OFDMA signal transmission apparatus.
Figure 2:
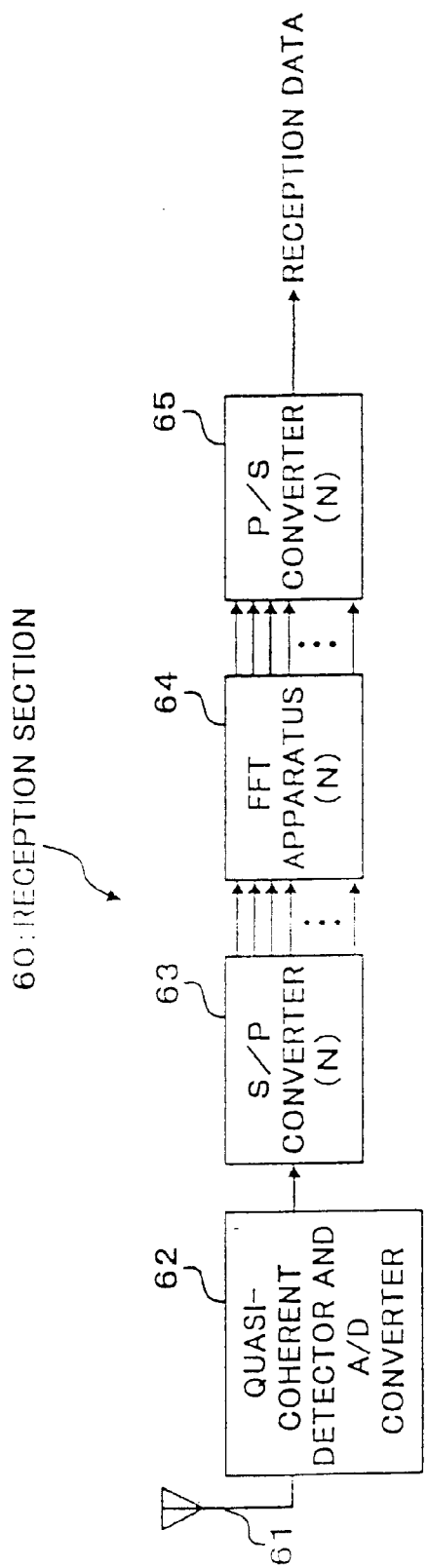
FIG. 2 is a block diagram showing a reception section in a conventional OFDMA signal reception transmission apparatus.
Figure 3:
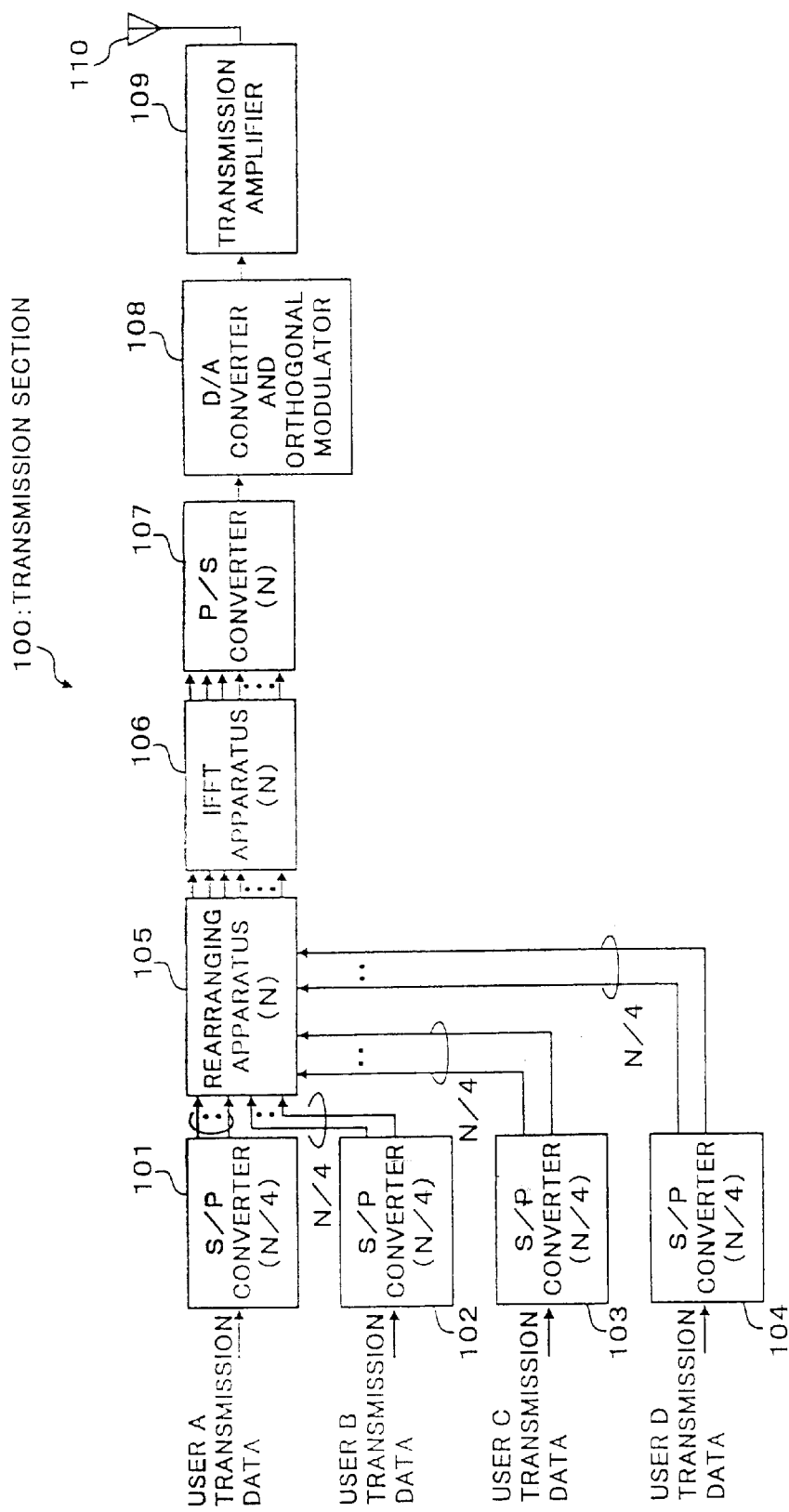
FIG. 3 is a block diagram showing a transmission section in an OFDMA signal transmission apparatus according to a first embodiment of the present invention.

FIG. 3 is a block diagram showing the configuration of a transmission section in an OFDMA signal transmission apparatus according to a first embodiment of the present invention. It should be noted that transmission section 100 shown in FIG. 3 is an example of the configuration in the base station when multiple access is provided to four users (four mobile stations).

The feature of the first embodiment lies in that the sub-carriers are selected at intervals of a power of 2 and assigned if an amount of information to be transmitted is small, thereby the total number of IFFT operations used in the transmission can be reduced low power consumption can be improved.

The transmission section 100 shown in FIG. 3 mainly comprises S/P converters 101 to 104, rearranging apparatus 105, IFFT apparatus 106, P/S converter 107, D/A converter and orthogonal modulator 108, and a transmission amplifier 109, and a transmission antenna 110.

Figure 4:
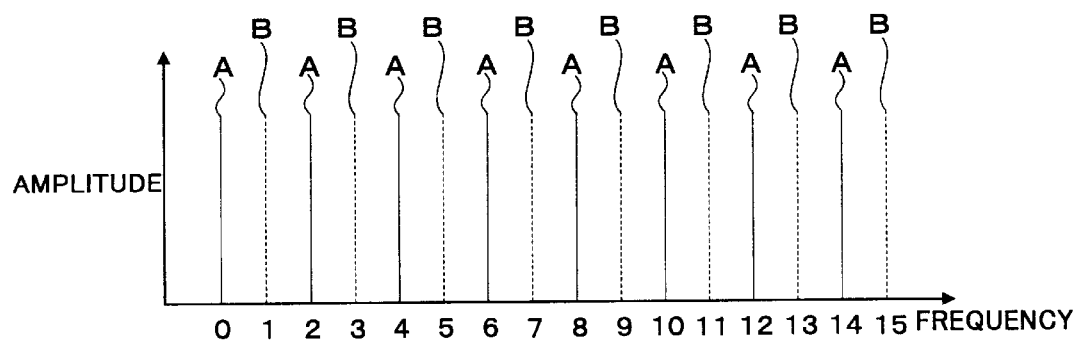
FIG. 4 is a sub-carrier assignment view showing a first example of sub-carrier assignment in the OFDMA signal transmission apparatus according to the first embodiment of the present invention.

FIG. 4 is a sub-carrier assignment view showing a first example of sub-carrier assignment in the OFDMA signal transmission apparatus according to the first embodiment of the present invention, that is an example of using 16 sub-carriers to be divided by two users (A, B).

In the case of 16 sub-carriers, if 8 sub-carriers are assigned to each user, two users can be contained. Here, as shown in FIG. 4, it is assumed that user A transmission data is assigned to even-numbered sub-carriers and user B transmission data is assigned to odd-numbered sub-carriers. When user B does not perform communications, only even-numbered sub-carriers are present. In this case, performance of IFFT, which is used in modulation, makes it possible to halve the number of sub-carriers, which are used to change data to time waveform.

Figure 5:
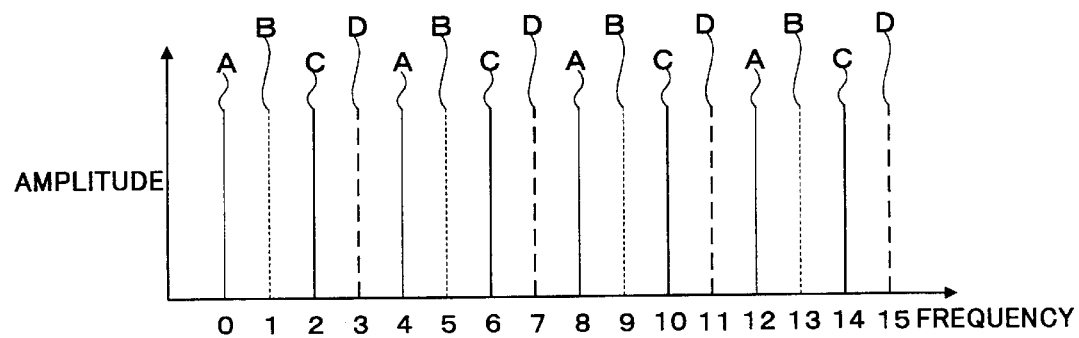
FIG. 5 is a sub-carrier assignment view showing a second example of sub-carrier assignment in the OFDMA signal transmission apparatus according to the first embodiment of the present invention.

FIG. 5 is a sub-carrier assignment view showing a second example of sub-carrier assignment in the OFDMA signal transmission apparatus according to the first embodiment of the present invention, that is an example of using 16 sub-carriers to be divided by four users (A, B, C, D).

For example, in the case of 16 sub-carriers, if 4 sub-carriers are assigned to each user, four users can be contained. Here, as shown in FIG. 5, it is assumed that user A transmission data is assigned to sub-carriers where a remainder of 4 is 0 and user B transmission data is assigned to sub-carriers where a remainder of 4 is 1. Also, it is assumed that user C transmission data is assigned to sub-carriers where a remainder of 4 is 2 and user D transmission data is assigned to sub-carriers where a remainder of 4 is 3. When only user A performs communications, only the sub-carriers where the remainder of 4 is 0 are present. Thus, the sub-carriers are assigned to each user at intervals of four sub-carriers, allowing the number of sub-carriers of IFFT used in modulation to be reduced to ¼ in the case of only one user. Similarly, the number of sub-carriers of IFFT can be reduced to ½ in the case of only two users.

FIG. 3 is an example in which the base station contains four users, and it is assumed that the total number of sub-carriers is N. User A transmission data, user B transmission data, user C transmission data, and user D transmission data are converted to parallel data every N/4 symbol by different. S/P converters 101 to 104, respectively.

The resultant data is rearranged by rearranging apparatus 105 such that the sub-carriers are rearranged to have intervals of the power of 2. In this case, the interval is 4.

IFFT apparatus 106 and P/S converter 107 set the number of sub-carriers and that of samples to be variable in unit of the power of 2 as in N, N/2, N/4.

This makes it possible to set the number of sub-carriers of IFFT apparatus 106 and that of samples of P/S converters 107 to N/4, N/2, respectively when the number of users, which perform communications is one or two. For this reason, the number of operations can be reduced depending on the amount of information to be transmitted, and this allows reduction in power consumption to be improved.

When the number of sub-carriers is smaller than N, the same output data of P/S converter 107 is repeatedly used. Even a case in which only the sub-carriers where the remainder of 4 is a value other than 0 (1 or 2) are transmitted, the above can be applied to such a case by repeatedly using the output data of P/S converter 107 in a state that the positive and negative are inverted.

Output data of P/S converter 107 is modulated by D/A conversion/orthogonal modulator 108 and the modulated data is amplified by transmission amplifier 109, and the amplified data is emitted from transmission antenna 110.

Thus, in the transmission section, which performs OFDMA signal transmission, the plurality of serial signals is converted to parallel signals, respectively, and the converted parallel signals are rearranged at intervals of the power of 2, and the sub-carrier assignment is carried out. Then, inverse Fourier transform is performed with respect to the number of sub-carriers, which has been varied depending on the number of rearranged parallel signals, so that transform to time-waveform is carried out. This makes it possible to reduce the number of operations, and the reduction the reduction in power consumption resulting from the reduction in the number of operations can be improved.

Though this embodiment explained the example of the transmission in the base station, the similar operation and effect can be obtained even in the transmission in the mobile station.

Second Embodiment

Figure 6:
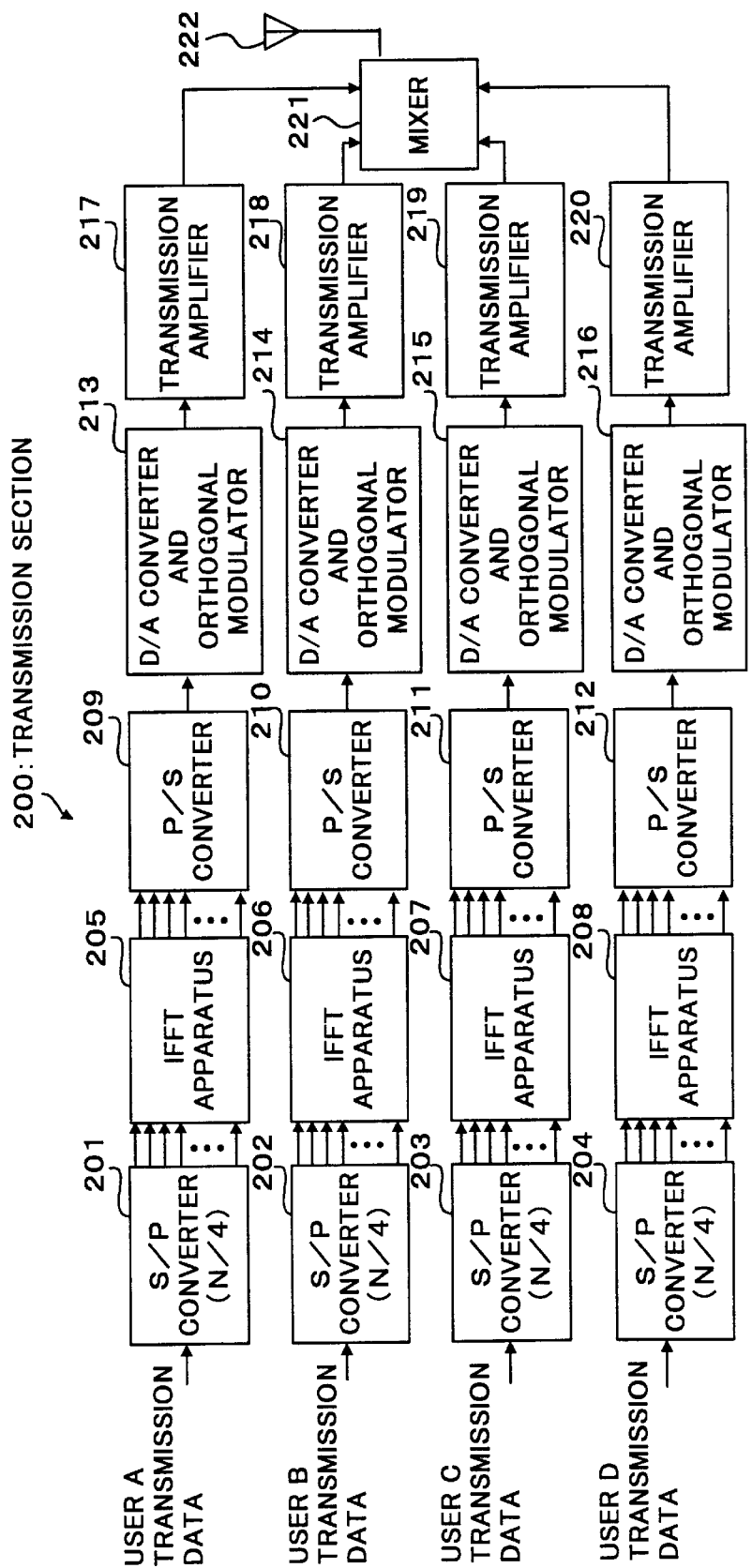
FIG. 6 is a block diagram showing a transmission section in an OFDMA signal transmission apparatus according to a second embodiment of the present invention.

FIG. 6 is a block diagram showing the configuration of the transmission section in the OFDMA signal transmission apparatus according to a second embodiment.

The feature of second embodiment lies in that when a traffic volume is low, the sub-carriers are selected at a fixed interval and assigned, whereby reducing the total number of operations of IFFT used in the transmission so as to improve the reduction in power consumption. Also, the feature thereof lies in that the output of each FFT is amplified by a different transmission amplifier so as to reduce the dynamic range per one transmission amplifier.

Transmission section 200 shown in FIG. 6 mainly comprises S/P converters 201 to 204, IFFT apparatuses 205 to 208, P/S converters 209 to 212, D/A converter and orthogonal modulators 213 to 216, transmission amplifiers 217 to 220, a mixer 221, and transmission antenna 222.

In such a configuration, the same sub-carrier assignment as that of the first embodiment is performed.

User A transmission data is converted to parallel data by S/P converter 201 and this parallel data is converted to data of a time region by IFFT apparatus 205. This converted data is converted to serial data by P/S converter 209, and D/A converter and orthogonal modulator 213 converts this serial data to analog signals, thereafter orthogonally modulates the analog signals. Moreover, the orthogonally modulated signals are amplified by the transmission amplifier 217, and the amplified signals are output to mixer 221.

User B transmission data is converted to parallel data by S/P converter 202 and this parallel data is converted to data of a time region by IFFT apparatus 206. This converted data is converted to serial data by P/S converter 210 and D/A conversion/orthogonal modulator 214 converts this serial data to analog signals, thereafter orthogonally modulating the analog signals. Further, the modulated signals are amplified by the transmission amplifier 218, and the amplified signals are output to mixer 221.

Transmission section 200 shown in FIG. 6 mainly comprises S/P converters 201 to 204, IFFT apparatuses 205 to 208, P/S converters 209 to 212, D/A converter and orthogonal modulators 213 to 216, transmission amplifiers 217 to 220, a mixer 221, and transmission antenna 222.

In such a configuration, the same sub-carrier assignment as that of the first embodiment is performed.

User A transmission data is converted to parallel data by S/P converter 201 and this parallel data is converted to data of a time region by IFFT apparatus 205. This converted data is converted to serial data by P/S converter 209, and D/A converter and orthogonal modulator 213 converts this serial data to analog signals, thereafter orthogonally modulates the analog signals. Moreover, the orthogonally modulated signals are amplified by the transmission amplifier 217, and the amplified signals are output to mixer 221.

User B transmission data is converted to parallel data by S/P converter 202 and this parallel data is converted to data of a time region by IFFT apparatus 206. This converted data is converted to serial data by P/S converter 210 and D/A conversion/orthogonal modulator 214 converts this serial data to analog signals, thereafter orthogonally modulating the analog signals. Further, the modulated signals are amplified by the transmission amplifier 218, and the amplified signals are output to mixer 221.

User B transmission data is converted to parallel data by S/P converter 202 and this parallel data is converted to data of a time region by IFFT apparatus 206. This converted data is converted to serial data by P/S converter 210 and D/A conversion/orthogonal modulator 214 converts this serial data to analog signals, thereafter orthogonally modulating the analog signals. Further, the modulated signals are amplified by the transmission amplifier 218, and the amplified signals are output to mixer 221.

User C transmission data is converted to parallel data by S/P converter 203 and this parallel data is converted to data of a time region by IFFT apparatus 207. This converted data is converted to serial data by P/S converter 211 and D/A conversion/orthogonal modulator 215 converts this serial data to analog signals, thereafter orthogonally modulating the analog signals. Further, the modulated signals are amplified by the transmission amplifier 219, and the amplified signals are output to mixer 221.

User D transmission data is converted to parallel data by S/P converter 204 and this parallel data is converted to data of a time region by IFFT apparatus 208. This converted data is converted to serial data by P/S converter 212 and D/A conversion/orthogonal modulator 216 converts this serial data to analog signals, thereafter orthogonally modulating the analog signals. Further, the modulated signals are amplified by the transmission amplifier 220, and the amplified signals are output to mixer 221.

Mixer 221 mixes all signals orthogonally modulated, and the mixed signal is emitted through the transmission antenna 222.

Though the above explained the example of the transmission in the base station, the similar operation and effect can be obtained even in the transmission in the mobile station if a kind of information to be transmitted is different and the transmission rate is variable.

Thus, in the transmission section, which performs OFDMA signal transmission, the serial signals are converted to parallel signals. Then, inverse Fourier transform is performed with respect to the number of sub-carriers, which has been varied depending on the number of converted parallel signals, so that transform to time-waveform is carried out. Then, the converted parallel signals are converted to serial signals. This allows power consumption to be reduced without performing IFFT with respect to the vacant sub-carriers where no data is transmitted.

This embodiment has advantages over the first embodiment in the following points. Namely, the number of operations of IFFT is proportional to $N \cdot \log 2N$ if the number of sub-carriers is N. For this reason, if two IFFT apparatuses with N/2 are provided, $N \cdot \log 2(N/2)$ is established, and if four IFFT apparatuses with N/4 are provided, $N \cdot \log 2(N/4)$ is established. In either of two cases, since the total number of operations is smaller than IFFT with N, the total number of operations can be reduced by this configuration.

Moreover, since the number of sub-carriers is small in the input signal to each transmission amplifier, the dynamic range, which is required in the transmission amplifier, is small, the range of linearity may be narrow, and an optimal amplification can be easily realized.

Third Embodiment

Figure 7:
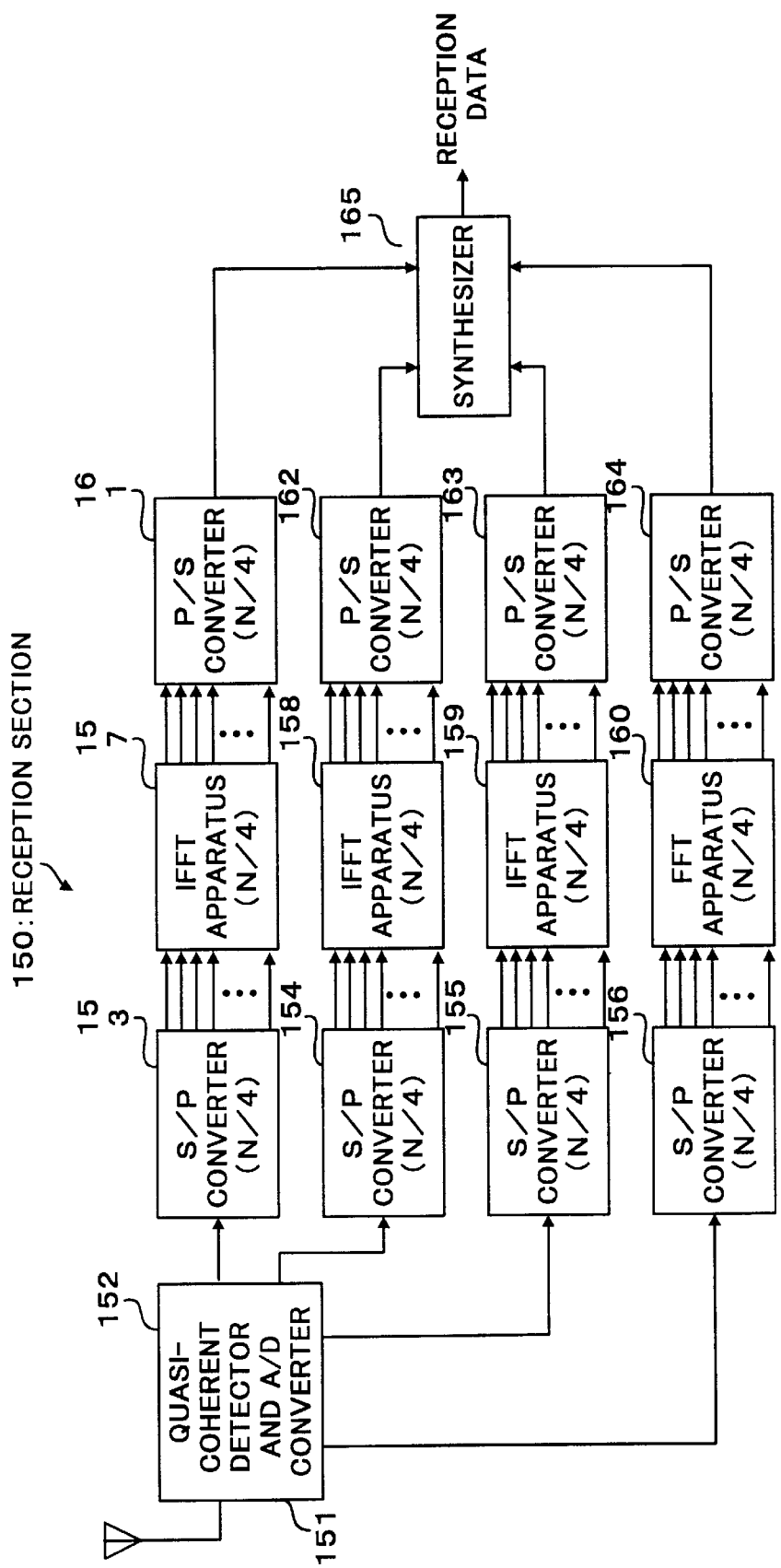
FIG. 7 is a block diagram showing a transmission section in an OFDMA signal transmission apparatus according to a third embodiment of the present invention.

FIG. 7 is a block diagram showing the configuration of a transmission section in an OFDMA signal transmission apparatus according to a third embodiment of the present invention.

The feature of the third embodiment lies in the following points. Namely, in the case of the transmission in which the sub-carriers are selected at intervals of the power of 2 and assigned as explained in the first and second embodiments, demodulation is performed by a plurality of FFT apparatus with a small number of sub-carriers when the amount of information to be transmitted is small, whereby reducing the total number of FFT operations on the receiver side so as to decrease power consumption.

Reception section 150 shown in FIG. 7 mainly comprises reception antenna 151, quasi-coherent detector and A/D converter 152, S/P converters 153 to 156, FFT apparatuses 157 to 160, P/S converters 161 to 164, and synthesizer 165.

This configuration corresponds to the case in which the sub-carriers are used at intervals of 4 on the transmission side as shown in FIG. 5.

Figure 8:
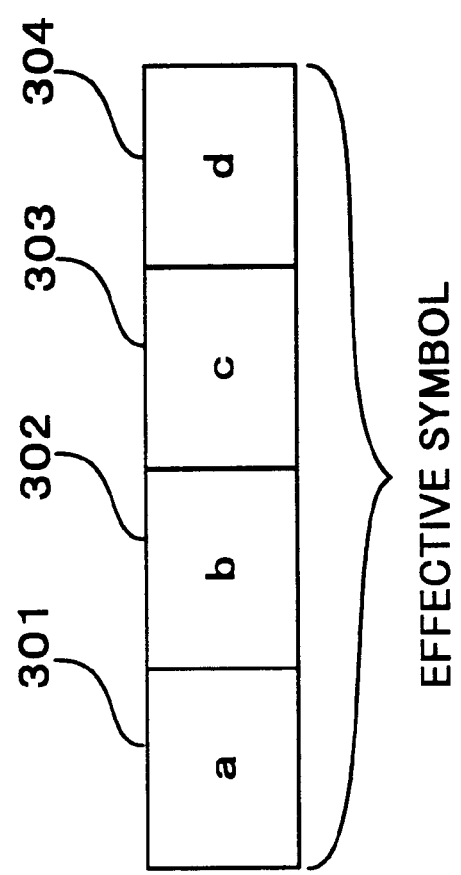
FIG. 8 is a configuration view of effective symbols to explain the operation of the OFDMA signal transmission apparatus according to the third embodiment of the present invention.

FIG. 8 is a configuration view of effective symbols to explain the operation of the OFDMA signal transmission apparatus according to the third embodiment of the present invention. In FIG. 8, signal a 301, signal b 302, signal c 303, and signal d 304 are signals, which are obtained by dividing the effective symbol into quarters. In the case of OFDMA, signals 301 to 304 become all the same. For example, if the symbol rate is 1 bps and the frequency of effective symbol is 4 Hz, the respective signals 301 to 304 correspond to one cycle of the effective symbol.

For this reason, the signals, which are obtained by demodulating the signals received by reception antenna 151 by orthogonal modulator and A/D converter 152 and sampling them, are divided into four at time. Then, one of them is demodulated by sequence processing of S/P converter 153, FFT apparatus 157, and P/S converter 161. Similarly, one of three residual signals is demodulated by sequence processing of S/P converter 154, FFT apparatus 158, and P/S converter 162. Similarly, one of two residual signals is demodulated by sequence processing of S/P converter 155, FFT apparatus 159, and P/S converter 163. Similarly, one residual signal is demodulated by sequence processing of S/P converter 156, FFT apparatus 160, and P/S converter 164.

Then, the demodulation results, which have been output from P/S converters 161 to 164, are synthesized by synthesizer 165 so as to obtain received data having a good quality.

In a case in which signals 301 to 304 use only the sub-carriers where the remainder of 4 is a value other than 0 (1 or 2 or 3), a difference between positive and negative states occurs as compared with the case in which the remainder of 4 is 0. However, by synthesizing the signals after compensation, the same performance as the case in which the sub-carriers where the remainder of 4 is only 0 can be obtained. The same effect can be obtained regardless of the base station and the mobile station. The number of FFT operations is proportional to N·log2N if the number of sub-carriers is N. For this reason, if two IFFT apparatuses with N/2 are provided, N·log2 (N/2) is established, and if four IFFT apparatuses with N/4 are provided, N·log2 (N/4) is established. In either of two cases, since the total number of operations is smaller than FFT with N, the total number of in operations can be reduced by this configuration.

Thus, in the reception section, which receives the signals to which only the sub-carriers are assigned at intervals of the power of 2 by the OFDMA signal transmission, the signals are converted to digital signals after being orthogonally demodulated, and the digital signals are divided at each time. Then, the respective signals are converted to the parallel signals, Fourier transform is performed, and the parallel signals of the plurality of sequences are synthesized. This makes it possible to reduce the total number of operations as compared with the conventional FFT in which the sub-carriers N are processed.

Fourth Embodiment

FIG. 8 is a block diagram showing the configuration of a transmission section in an OFDMA signal transmission apparatus according to a fourth embodiment of the present invention.

The feature of the fourth embodiment lies in the following points. Namely, in the case of the transmission in which the sub-carriers are selected at intervals of the power of 2 and assigned as explained in the first and second embodiments, demodulation is performed by a plurality of FFT apparatuses with a small number of sub-carriers when the amount of information to be transmitted is small. Also, the number of signals to be synthesized is selected by use of an error detection, whereby the total number of FFT operations can be reduced on the receiver side without performing unnecessary FFT so as to decrease power consumption.

Figure 9:
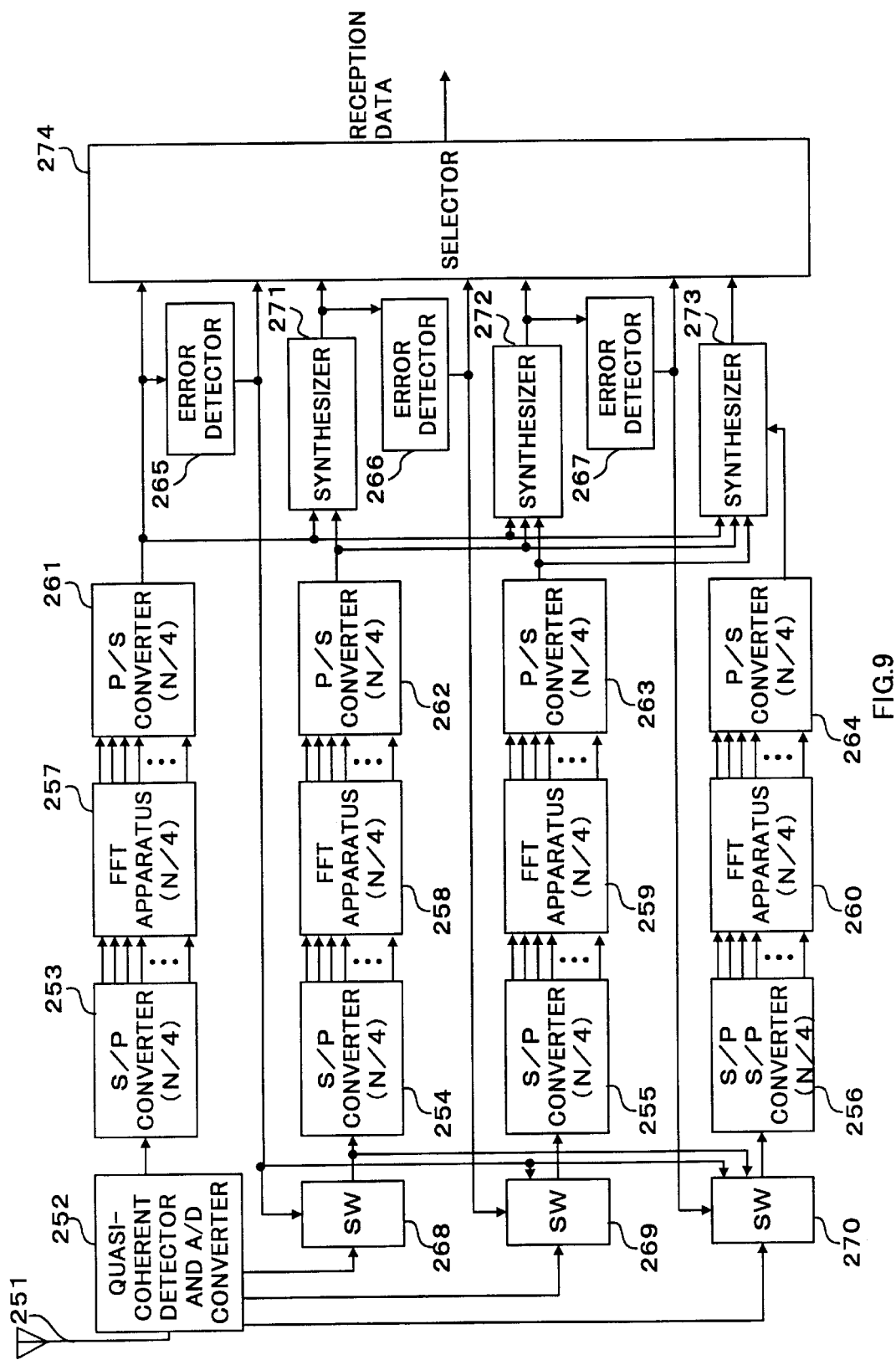
FIG. 9 is a block diagram showing a transmission section in an OFDMA signal transmission apparatus according to a fourth embodiment of the present invention.

Reception section 250 shown in FIG. 9 mainly comprises reception antenna 251, orthogonal modulator and A/D converter 252, S/P converters 253 to 256, FFT apparatuses 257 to 260, P/S converters 261 to 264, error detector 265 to 267, switches (SW) 268 to 270, synthesizers 271 to 273, and selector 274.

As described in first and second embodiments, if the sub-carriers to be transmitted are set at intervals of the power of 2, the signals, which are obtained by dividing the effective symbol into quarters, are used when the sub-carriers in which the remainder of 4 is 0 are used. Signals 301 to 304 shown in FIG. 8 become all the same.

For this reason, the signals, which are obtained by demodulating the signals received by reception antenna 251 by orthogonal modulator and A/D converter 252 and sampling them, are divided into four at time. Then, signal a 301, which is the first part of the signals, is demodulated by the first sequence processing of S/P converter 253, FFT apparatus 257, and P/S converter 261.

The result is error detected by error detector 265. If there is no error, demodulation can be ended at this time, and stop control is provided to switches 268 to 270 not to perform the demodulation of the other three sequences, with the result that power consumption is reduced.

At this time, selector 274 selects the output of P/S converter 261, and the selected output is used as reception data.

While, if an error is detected by error detector 265, the second signal b 302 is demodulated by the second sequence processing. Namely, first of all, switch 268 is controlled to pass the signals from orthogonal modulator and A/D converter 252, and then demodulation is provided to signal b 302 by S/P converter 254, FFT apparatus 258, and P/S converter 262.

This demodulation result and the demodulation result from the P/S converter 261 of the first sequence are synthesized by the synthesizer 271. This allows S/N ratio to be improved, with the result that the probability of error detection can be reduced.

The result of the synthesizer 271 is error detected by error detector 266. If there is no error, demodulation can be ended at this time, and stop control is provided to switches 269 and 270 not to perform the modulation of the other two sequences of the back stages, with the result that power consumption is reduced. Also, selector 274 selects the output of synthesizer 271, and the selected output is used as reception data.

If an error is detected by error detector 266, the third signal c 303 is demodulated. Namely, first of all, switch 269 is controlled to pass the signals, and then demodulation is provided to signal c 303 by S/P converter 255, FFT apparatus 259, and P/S converter 263.

This demodulation result and the demodulation results from the P/S converters 261 and 262 are synthesized by the synthesizer 272. This allows S/N ratio to be further improved, with the result that the probability of error detection can be further reduced.

The result of the synthesizer 272 is error detected by error detector 267. If there is no error, demodulation can be ended at this time, and stop control is provided to switch 270 not to perform the modulation of the last sequence, with the result that power consumption is reduced.

At this time, selector 274 selects the output of synthesizer 272, and the selected output is used as reception data. In this case, synthesizer 272 may synthesize the result of P/S converter 263 with that of synthesizer 271.

If an error is detected by error detector 267, the fourth signal d 304 is demodulated. Namely, first of all, switch 270 is controlled to pass the signals, and then demodulation is provided to signal d 304 by S/P converter 256, FFT apparatus 260, and P/S converter 264.

This demodulation result and the demodulation results from the P/S converters 261, 262, 263 are synthesized by the synthesizer 273. This allows S/N ratio to be further improved, with the result that the probability of detection of error can be further reduced.

Even if the synthesized result is error detected, the result is unconditionally selected by selector 274 and the selected result is used as reception data since there is no means for further improving S/N. In this case, synthesizer 273 may synthesize the result of P/S converter 264 with that of synthesizer 272.

In a case where signals 301 to 304 use only the sub-carriers where the remainder of 4 is a value other than 0, a difference between positive and negative states occurs. However, by synthesizing the signals after compensation, the same performance as the case in which the sub-carriers where the remainder of 4 is only 0 can be obtained. The same effect can be obtained regardless of the base station and the mobile station.

Thus, in the reception section, which receives the signals to which only the sub-carriers are assigned at intervals of the power of 2 by the OFDMA signal transmission, the signals are converted to digital signals after being orthogonally demodulated, and the digital signals are divided at each time. Then, the respective signals are converted to the parallel signals and Fourier transformed to the signals on a frequency axis. Then, the signals are converted to the serial signals, and the serial signals of the plurality of sequences are synthesized. This makes it possible to reduce the total number of operations as compared with the conventional FFT in which the sub-carriers N are processed.

Thus, in the reception section, which receives the signals to which only the sub-carriers are assigned at intervals of the power of 2 by the OFDMA signal transmission, the first part of the signals, which have been obtained by converting the signals to digital signals after being orthogonally demodulated and dividing the digital signals at each time, is converted to the parallel signal and Fourier transformed. Then, the parallel signal is converted to the serial signal, and the serial signal is error detected. If an error is detected, the similar processing is provided to the signal part of the next stage and the resultant signal and the previous signal are synthesized with each other.

Afterward, as long as the error is present in the synthesized signal, the resultant signal is synthesized with the signal of the previous stage in the same way as mentioned above, and the signal having no error is selected and the selected signal is used as reception data. If the reception quality is good, only the first part of the received signals has only to be used, and the reception operation can be completed with a small amount of operations. This makes it possible to further reduce the average power consumption as compared with the third embodiment.

Fifth Embodiment

Figure 10:
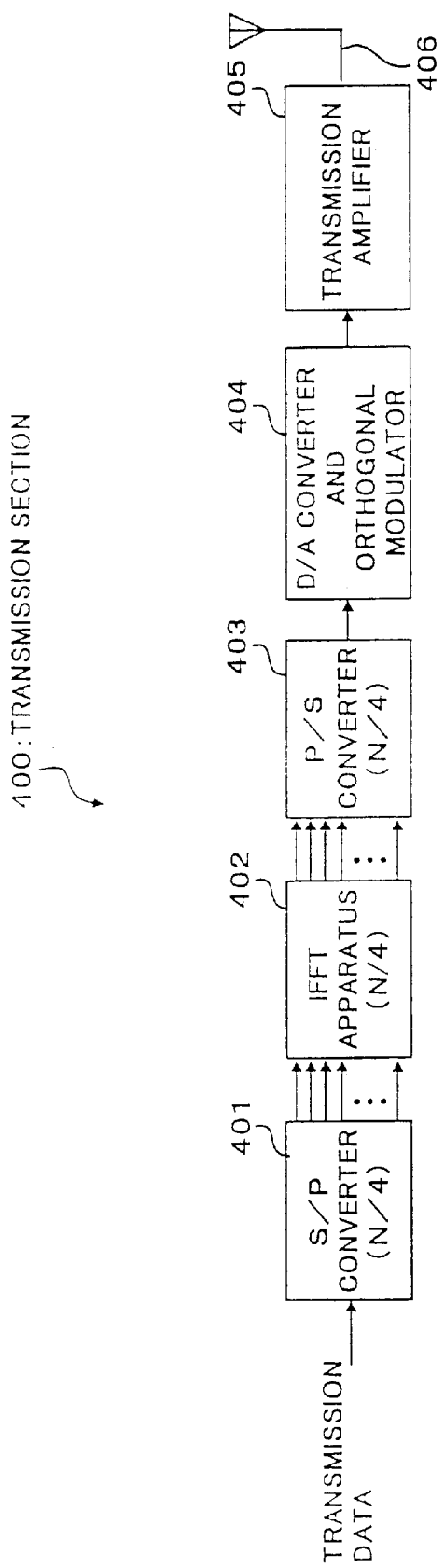
FIG. 10 is a block diagram showing a transmission section in an OFDMA signal transmission apparatus according to a fifth embodiment of the present invention.

FIG. 10 is a block diagram showing the configuration of a transmission section in an OFDMA signal transmission apparatus according to a fifth embodiment of the present invention.

The feature of the fifth embodiment lies in the following points. Namely, the sub-carriers are continuously assigned to each mobile station so that modulation can be carried out by FFT, which is different depending on each mobile station on the reception side. As a result, the total number of FFT operations can be reduced, and AFC, which is different depending on each mobile station, can be provided so as to improve the performance.

Transmission section 400 shown in FIG. 10 is used in, for example, the mobile station, and mainly comprises S/P converter 401 to which transmission data is input, IFFT apparatus 402, D/A converter and orthogonal modulator 404, transmission amplifier 405, and transmission antenna 406.

Figure 11:
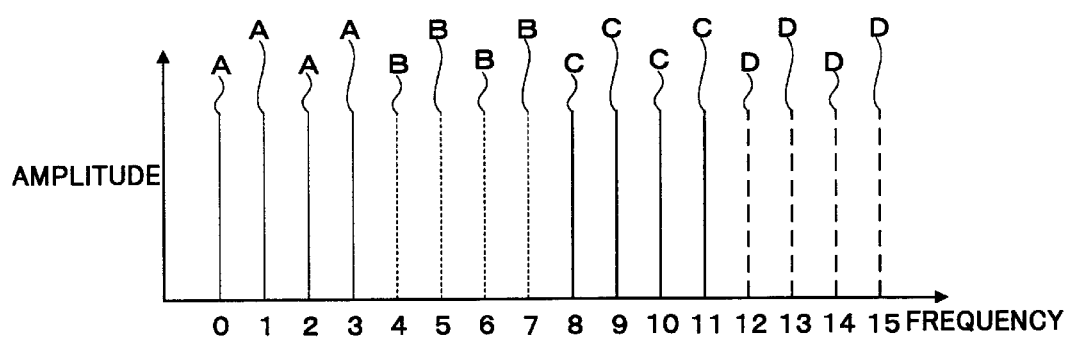
FIG. 11 is a sub-carrier assignment view showing an example of sub-carrier assignment in the OFDMA signal transmission apparatus according to the fifth embodiment of the present invention.

FIG. 11 is a sub-carrier assignment view showing an example of sub-carrier assignment in the OFDMA signal transmission apparatus according to the fifth embodiment of the present invention.

Figure 12:
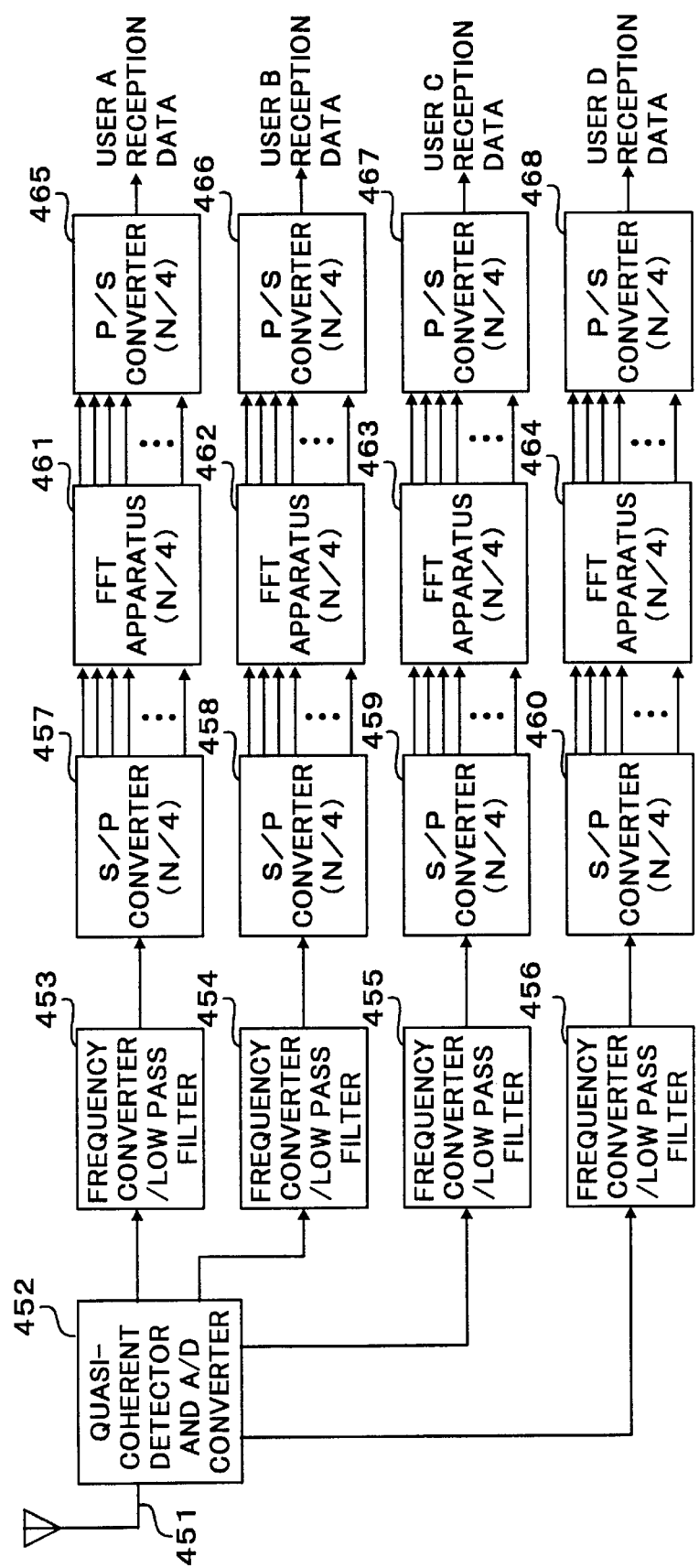
FIG. 12 is a block diagram showing a reception section in the OFDMA signal transmission apparatus according to the fifth embodiment of the present invention.

FIG. 12 is a block diagram showing the configuration of a reception section in the OFDMA signal transmission apparatus according to the fifth embodiment of the present invention.

Reception section 450 shown in FIG. 12 is used in the base station, and the configuration example that multiplexes four users. Reception section 450 mainly comprises reception antenna 451, quasi-coherent detector and A/D converter 452, frequency converter/low-pass filters 453 to 456, P/S converters 457 to 460, FFT apparatuses 461 to 464, and P/S converters 465 to 468.

In such a configuration, it is assumed that transmission section 400 shown in FIG. 10 is a transmission part of user A, which is a mobile station. Transmission data is converted to parallel data by S/P converter 401 so as to arrange transmission data of user A on the frequency axis as shown in FIG. 11.

The above arranged data is converted to time signals by IFFT apparatus 402 and the time signals are converted to serial data by P/S converter 403 so as to be changed to time series data. Time series data is converted to analog signals by D/A converter and orthogonal modulator 404. Thereafter, orthogonal modulation is provided to the analog signals, and the orthogonally modulated signals are amplified by transmission amplifier 405, and the amplified signals are emitted from the transmission antenna 406.

Regarding users B, C, and D, the similar transmission is performed, so that the signals whose bands are divided for each user, are emitted as shown in FIG. 11.

The emitted signals are received by the reception antenna 451 of reception section 450 shown in FIG. 12. The received data is orthogonally modulated by quasi-coherent detector and A/D converter 452. Thereafter, the orthogonally modulated data is converted to digital signals, and output to frequency converter/low-pass filter 453.

Frequency converter/low-pass filter 453 provides frequency conversion to the previous digital signals such that transmission data of user A becomes base band signals. Thereafter, only low pass signals are extracted by filtering, so that only the signals of user A are extracted.

These signals are converted to parallel signals by S/P converter 457 and are Fourier transformed to signals on the frequency axis by FFT apparatus 461. Then, the converted signals are converted to serial signals by P/S converter 465, whereby extracting reception data of user A.

Similarly, frequency converter/low-pass filter 454 provides frequency conversion to the previous digital signals such that transmission data of user B becomes base band signals. Thereafter, only low pass signals are extracted by filtering, so that only the signals of user B are extracted.

These signals are converted to parallel signals by S/P converter 458 and are Fourier transformed to signals on the frequency axis by FFT apparatus 462. Then, the converted signals are converted to serial signals by P/S converter 466, whereby extracting reception data of user B.

Similarly, frequency converter/low-pass filter 455 provides frequency conversion to the previous digital signals such that transmission data of user C becomes base band signals. Thereafter, only low pass signals are extracted by filtering, so that only the signals of user C are extracted.

These signals are converted to parallel signals by S/P converter 459 and are Fourier transformed to signals on the frequency axis by FFT apparatus 463. Then, the converted signals are converted to serial signals by P/S converter 467, whereby extracting reception data of user C.

Similarly, frequency converter/low-pass filter 456 provides frequency conversion to the previous digital signals such that transmission data of user D becomes base band signals. Thereafter, only low pass signals are extracted by filtering, so that only the signals of user D are extracted.

These signals are converted to parallel signals by S/P converter 460 and are Fourier transformed to signals on the frequency axis by FFT apparatus 464. Then, the converted signals are converted to serial signals by P/S converter 468, whereby extracting reception data of user D.

Thus, the frequency bands of the signals transmitted from each mobile station are made different from each other. Then, in the reception section of the base station, the received signals converted to the digital signals are divided for each frequency band, and the signals are converted to the base band signals for each band, thereafter the band is limited., Then, each signal band-limited is converted to the parallel signal and is Fourier transformed. Then, the parallel signal is converted to the serial signal. Since this makes it possible to convert the respective signals to low frequency signals for each user, each FFT apparatus can be downsized.

In this example, the number of sub-carriers of FFT is reduced to ¼. This results in the reduction in the total number of FFT operations, and this allows power consumption to be reduced.

Also, since the signals of users A to D are separated, AFC (Automatic Frequency Control) is individually provided to the respective signals by the frequency converter/low-pass filter, allowing the compensation for frequency offset, which is different depending on each user. This makes it possible to improve the reception performance.

Sixth Embodiment

Figure 13:
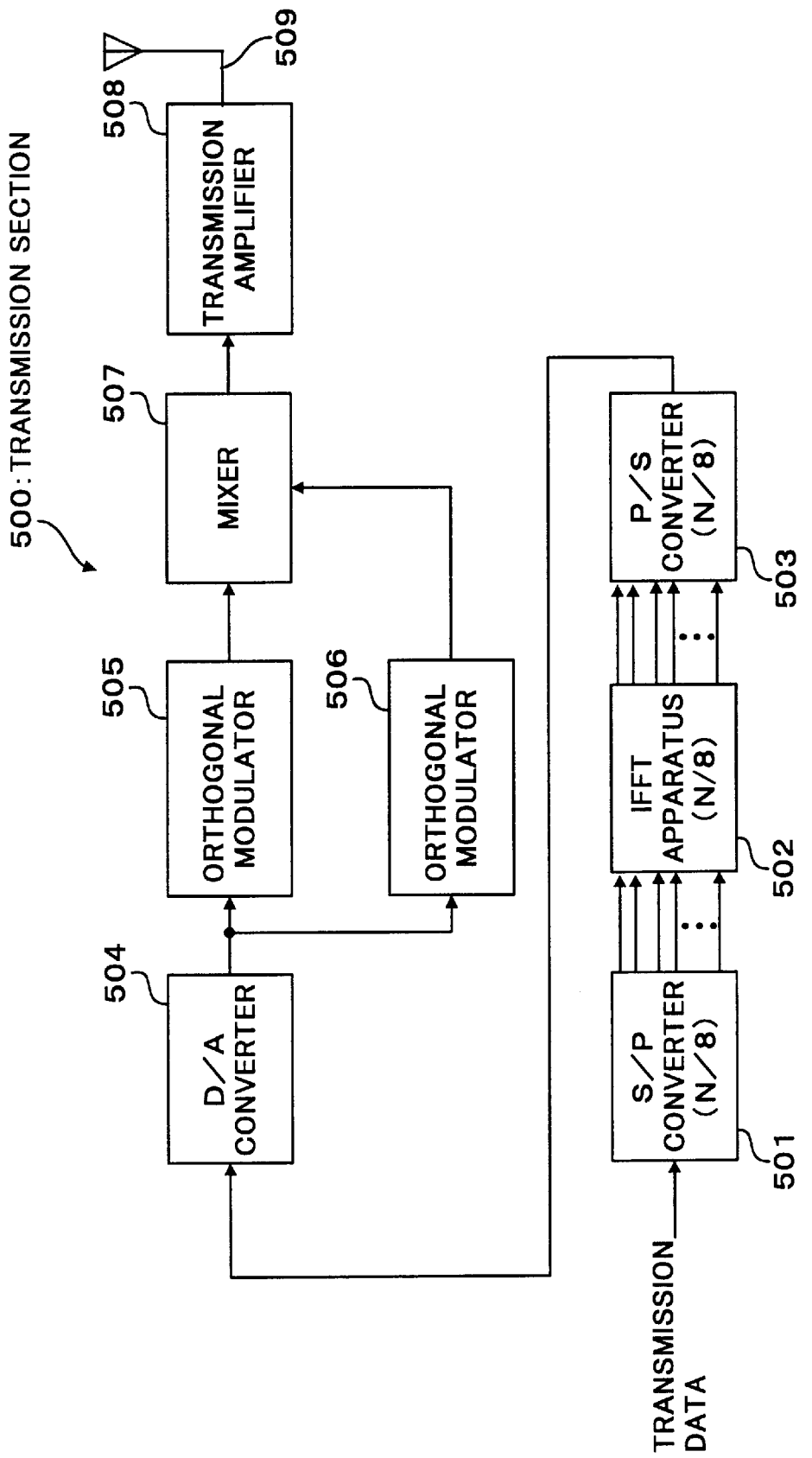
FIG. 13 is a block diagram showing a transmission section in an OFDMA signal transmission apparatus according to a sixth embodiment of the present invention.

FIG. 13 is a block diagram showing the configuration of a transmission section in an OFDMA signal transmission apparatus according to a sixth embodiment of the present invention.

The feature of the sixth embodiment lies in the following point. Namely, at the time of performing frequency diversity, orthogonal modulation is performed with respect to the same base band signals at the different frequency so as to reduce the number of operations of IFFT and to realize low power consumption.

Transmission section 500 shown in FIG. 13 is used in, for example, the mobile station, and mainly comprises S/P converter 501 to which transmission data is input, IFFT apparatus 502, P/S converter 503, D/A converter 504, orthogonal modulators 505, 506, mixer 507, transmission amplifier 508, and transmission antenna 509.

Figure 14:
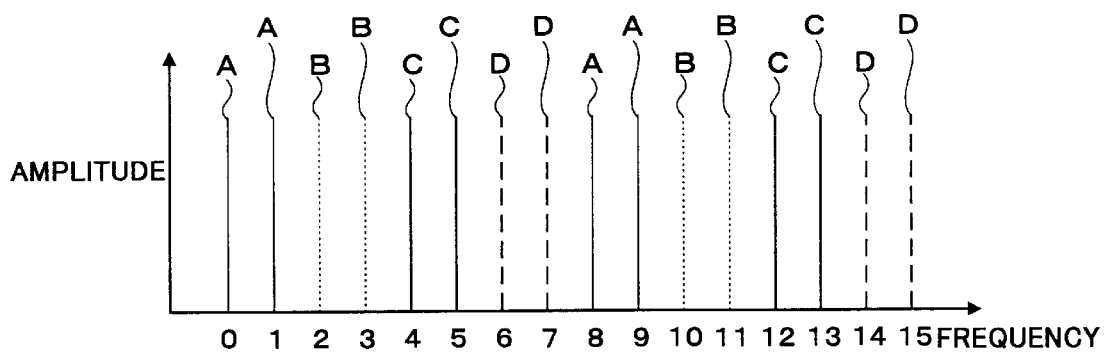
FIG. 14 is a sub-carrier assignment view showing an example of sub-carrier assignment in the OFDMA signal transmission apparatus according to the sixth embodiment of the present invention.

FIG. 14 is a sub-carrier assignment view showing an example of sub-carrier assignment in the OFDMA signal transmission apparatus according to the sixth embodiment of the present invention.

As shown in FIG. 14, transmission data of user A is mounted on sub-carrier numbers 0, 1, and 8, 9, allowing frequency diversity to be realized. Namely, this realizes the so-called diversity. In other words, the frequencies are set separately from each other such that the fading of sub-carriers 0, 1 or that of sub-carriers 8, 9 becomes substantially independent of each other. Whereby, there is a high probability that the other can be received with a sufficient level even if either one of sub-carriers is subject to a large attenuation by fading.

Similarly, transmission data of user B is mounted on sub-carrier numbers 2, 3, and 10, 11, transmission data of user C is mounted on sub-carrier numbers 4, 5 and 12, 13, and transmission data of user D is mounted on sub-carrier numbers 6, 7, and 14, 15, respectively, allowing frequency diversity to be realized.

In FIG. 13, transmission data is converted to parallel data by S/P converter 501. Then, parallel data is converted to time signals by IFFT apparatus 502, and the time signals are converted to serial data by P/S converter 503 so as to be changed to time series data. Time series data is converted to analog signals by D/A converter 504. Thereafter, orthogonal modulators 505 and 506 orthogonally modulate the analog signals at different central frequencies, and the resultant signals are synthesized by mixer 507.

This makes it possible to mount the same signals on the different sub-carriers as shown in FIG. 14. Then, the synthesized signals are amplified by transmission amplifier 508, and the amplified signals are emitted from transmission antenna 509.

Thus, in the transmission section, which performs the OFDMA signal transmission, transmission data, which has been converted to serial data, is converted to analog signals, and data converted to analog signals and a plurality of carriers each having a different center frequency are orthogonally modulated. The orthogonally modulated signals are mixed and transmitted to perform frequency diversity. For this reason, at the time of performing frequency diversity, processing of one sequence may be used until D/A conversion, with the result that the number of operations of IFFT can be largely reduced, and this allows reduction in power consumption to be improved.

Seventh Embodiment

Figure 15:
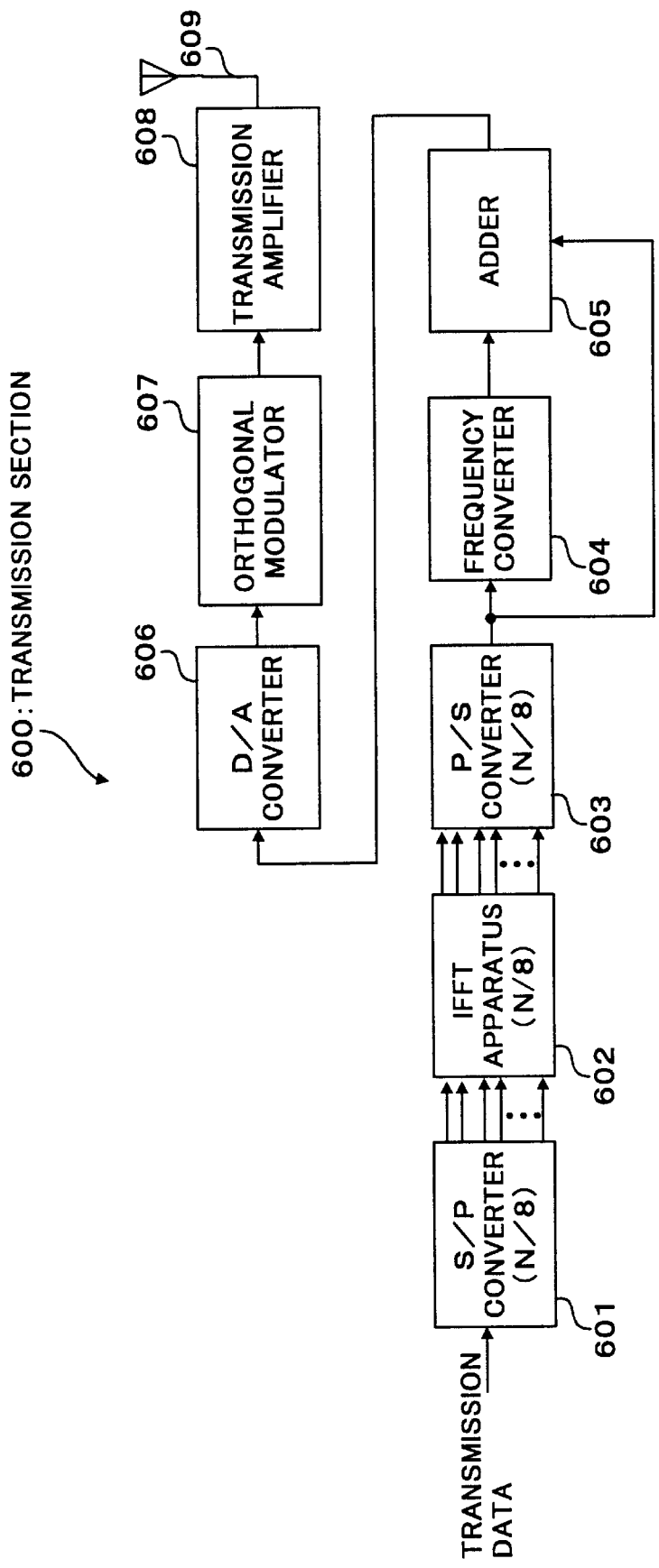
FIG. 15 is a block diagram showing a transmission section in an OFDMA signal transmission apparatus according to a seventh embodiment of the present invention.

FIG. 15 is a block diagram showing the configuration of a transmission section in an OFDMA signal transmission apparatus according to a seventh embodiment of the present invention.

The feature of seventh embodiment lies in the following point. Namely, at the time of performing frequency diversity, signals are generated at a different frequency on the digital signals, and this allows the reduction in the number of operations of IFFT without increasing the number of orthogonal modulators, and this realizes the low power consumption.

Transmission section 600 shown in FIG. 15 is used in, for example, the mobile station, and mainly comprises S/P converter 601, IFFT apparatus 602, P/S converter 603, frequency converter 604, adder 605, D/A converter 606, orthogonal modulator 607, transmission amplifier 608, and transmission antenna 609.

In such a configuration, transmission data is converted to parallel data by S/P converter 601, and parallel data is converted to time signals by IFFT apparatus 602. Then, time signals are converted to serial data by P/S converter 603 so as to be changed to time series data.

Time series data is frequency converted by frequency converter 604, and frequency converted data and non-frequency converted data from P/S converter 603 are synthesized by adder 605. This makes it possible to mount the same signals on different sub-carriers as shown in FIG. 14.

Then, data synthesized by adder 605 is converted to analog signals by D/A converter 606, thereafter the analog signals are orthogonally modulated by orthogonal modulator 607. Then, the orthogonally modulated signals are amplified by transmission amplifier 609 and the amplified signals are emitted from transmission antenna 609.

Thus, in the transmission section, which performs the OFDMA signal transmission, transmission data, which has been converted to serial data, is frequency converted, and frequency converted data and serial data are added. Then, added data is converted to analog signals, and the analog signals are orthogonally modulated and transmitted. This makes it possible to perform processing in which the same signals are mounted on different sub-carriers whose frequencies are separated from each other by digital processing at the time of performing frequency diversity, with the result that the number of operations of IFFT can be reduced and power consumption can be improved. Further, as compared with the sixth embodiment, the number of analog circuits such as orthogonal modulators can be reduced.

Eighth Embodiment

Figure 16:
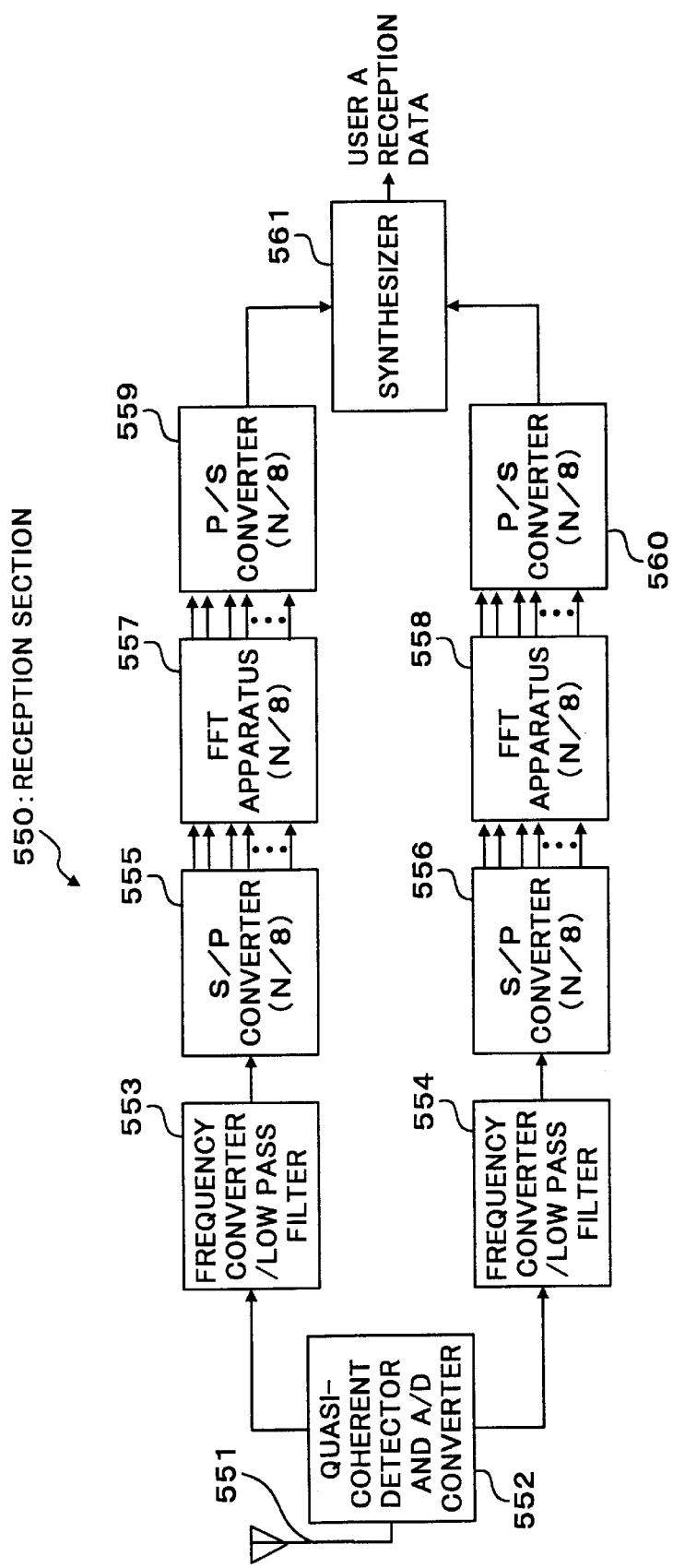
FIG. 16 is a block diagram showing a reception section in an OFDMA signal transmission apparatus according to an eighth embodiment of the present invention.

FIG. 16 is a block diagram showing the configuration of a reception section in an OFDMA signal transmission apparatus according to an eighth embodiment of the present invention. In FIG. 16, only the portion relevant to reception data of user A is shown.

The feature of the eighth embodiment lies in the following point. Namely, at the time of performing frequency diversity, FFT with a small number of sub-carriers is carried out every band, and the obtained results are synthesized, so that the total number of FFT operations can be reduced and low power consumption can be improved. Also, AFC processing, which is different depending on each received signal having a different frequency, is performed so as to improve the reception performance.

Transmission section 550 shown in FIG. 16 mainly comprises reception antenna 551, quasi-coherent detector and A/D converter 552, frequency converter/low pass filters 553, 554, P/S converters 559, 560, and synthesizer 561.

Reception section 550 shown in FIG. 16 is used in, for example, the base station. The mobile station, which is the receiver side, is configured such that frequency diversity can be carried out as in sixth and seventh embodiments.

In FIG. 16, the signals received by reception antenna 551 are orthogonally demodulated by quasi-coherent detector and A/D converter 5552, thereafter being A/D converted. As shown in FIG. 14, if each of four users uses two sub-carrier groups, eight sub-carrier groups are used.

Among these sub-carrier groups, A/D converted digital signals of user A form two sub-carrier groups each having a different center frequency. These signals are converted such that the signals of each band are set to low frequencies by frequency converter/low pass filters 553, 554.

In the case of the transmission signals as shown in FIG. 14, sub-carriers 0, 1 are extracted at frequency converter/low pass filter 553 and sub-carriers 8, 9 are extracted at frequency converter/low pass filter 554.

An output signal of frequency converter/low pass filter 553 is converted to parallel data by S/P converter 555, and parallel data is converted to a time signal by FFT apparatus 557, and the time signal is converted to serial data by P/S converter 559. Similarly, an output signal of frequency converter/low pass filter 554 is converted to parallel data by S/P converter 556, and parallel data is converted to a time signal by FFT apparatus 558, and the time signal is converted to serial data by P/S converter 560.

Signals output from P/S converters 559 and 560 are synthesized by synthesizer 561 using a maximum ratio synthesis method, whereby obtaining reception data of user A. This makes it possible to realize frequency diversity using the signal with sub-carriers 0, 1 and the signal with sub-carrier 8, 9.

By providing the same processing as mentioned above to the signals of the respective sub-carrier groups extracted from quasi-coherent detector and A/D converter 552, reception data of users B, C, D can be obtained, respectively (not shown in FIG. 16).

Thus, the frequency bands of the signals transmitted from the respective mobile stations are made different from each other. Then, in the reception section of the base station, the signals received by frequency diversity are orthogonally demodulated to be converted to the digital signals, and the digital signals are divided for each frequency band and the signals are converted to the base band signals for each band. Thereafter, the base band signals are converted to the parallel signals and are Fourier transformed to signals on the frequency axis. The parallel signals are converted to serial signals, and the serial signals are synthesized so as to obtain reception data. As a result, a good transmission quality can be obtained.

Also, since the FFT operation to each sub-carrier group is carried out after converting the signals to low frequency signals, the number of operations of each FFT is reduced and the total number of operations may be small on the whole as compared with the case in which TFF is performed by one operation. This allows power consumption to be reduced. Moreover, performance of AFC, which is different depending on each mobile station, makes it possible to compensate for frequency offset of individual mobile apparatuses.

Ninth Embodiment

Figure 17:
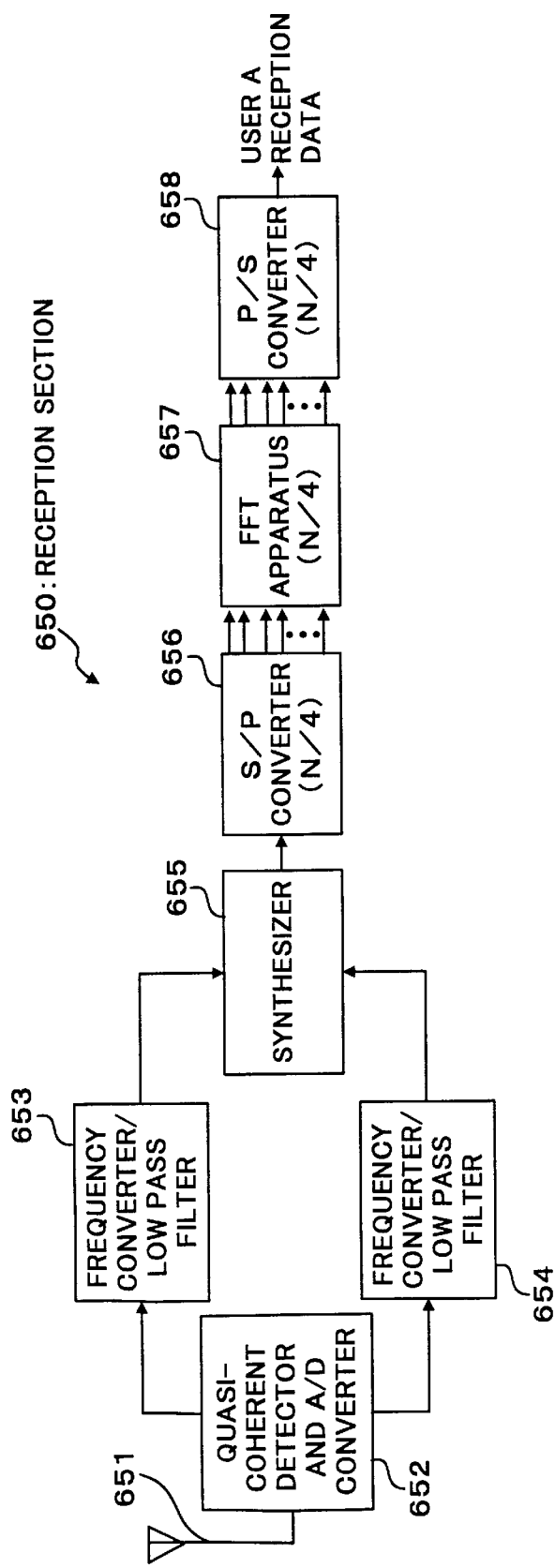
FIG. 17 is a block diagram showing a reception section in an OFDMA signal transmission apparatus according to an ninth embodiment of the present invention.

FIG. 17 is a block diagram showing the configuration of a reception section in an OFDMA signal transmission apparatus according to a ninth embodiment of the present invention. In FIG. 17, only the portion relevant to reception data of user A is shown.

The feature of the ninth embodiment lies in the following point. Namely, at the time of performing frequency diversity, the signals are extracted every band, and the extracted signals are converted to low pass signals. Then, the signals are synthesized for each user. Thereafter, FFT with a small number of sub-carriers, is carried out and the obtained results are synthesized, so that the total number of FFT operations can be further reduced as compared with the eighth embodiment, and low power consumption can be improved. Also, AFC processing, which is different depending on each mobile station, can be provided so as to improve the reception performance.

Transmission section 650 shown in FIG. 17 mainly comprises reception antenna 651, quasi-coherent detector and A/D converter 652, frequency converter/low pass filters 653, 654, S/P converter 656, FFT apparatus 657, and P/S converter 658.

Reception section 650 shown in FIG. 17 is used in, for example, the base station. The mobile station, which is the transmitter side, is configured such that frequency diversity can be carried out as in sixth and seventh embodiments.

In FIG. 17, the signals received by reception antenna 651 are orthogonally demodulated by quasi-coherent detector and A/D converter 652, thereafter being A/D converted. As shown in FIG. 14, if each of four users uses two sub-carrier groups, eight sub-carrier groups are used.

Among these sub-carrier groups, A/D converted digital signals of user A form two sub-carrier groups each having a different center frequency. These signals are converted such that the signals of the respective bands are set to low frequencies by frequency converter/low pass filters 653, 654.

In the case of the transmission signals as shown ,in FIG. 14, sub-carriers 0, 1 are extracted at frequency converter/low pass filter 653 and sub-carriers 8, 9 are extracted at frequency converter/low pass filter 654.

Signals output from frequency converter/low pass filters 653, 654 are synthesized by synthesizer 655 using a maximum ratio synthesis method, whereby realizing frequency diversity using the signal with sub-carriers 0, 1 of user A and the signal with sub-carrier 8, 9.

Synthesized data output from synthesizer 655 is converted to parallel data by S/P converter 656. Thereafter, parallel data is converted to time signals by FFT apparatus 657. Then, time signals are converted to serial data by P/S converter 658, whereby obtaining reception data of user A.

By providing the same processing as mentioned above to the signals of the respective sub-carrier groups extracted from quasi-coherent detector and A/D converter 652, reception data of users B, C, D, can be obtained, respectively (not shown in FIG. 17).

Thus, the frequency bands of the signals transmitted from the respective mobile stations are made different from each other. Then, in the reception section of the base station, the signals received by frequency diversity are orthogonally demodulated to be converted to the digital signals. Then, the digital signals are divided for each frequency band, and the signals are converted to the base band signals for each band to be synthesized. Thereafter, the synthesized signals are converted to the parallel signals and are Fourier transformed to signals on the frequency axis. The resultant signals are converted to serial signals so as to obtain reception data. Whereby, the same effect as that of the eighth embodiment can be obtained. In addition, the total number of FFT operations can be reduced to the half of the eighth embodiment, and this allows power consumption to be further reduced.

As being obvious from the above explanation, according to the present invention, by devising the arrangement of the sub-carriers of OFDM signals and providing the configuration, which is necessary for realizing the arrangement, to the transmission section or the reception section, the circuit configuration with a small amount of operations can be realized, and the reduction in power consumption can be improved.

Also, in the reverse signals, since the compensation for frequency offset, which is different depending on each user (mobile station), can be carried out by individual AFC, the reception quality can be improved.

This application is based on the Japanese Patent Application No. HEI 10-153214 filed on Jun. 2, 1998, entire content of which is expressly incorporated by reference herein.

What is claimed is:

1. An OFDMA signal transmission apparatus comprising:
an orthogonal demodulator that orthogonally demodulates received signals to which sub-carriers are only assigned at intervals of a power of 2 by the OFDMA signal transmission;
an A/D converter that converts the orthogonally demodulated signals to digital signals;
a signal processor of a plurality of sequences that converts the respective signals, which are obtained by dividing the digital signals at each time, to parallel signals, which are thereafter Fourier transformed, and for converting the parallel signals to serial signals; and
a synthesizer that synthesizes the serial signals output from the signal processor of the plurality of sequences.

2. The apparatus according to claim 1, wherein the synthesizer synthesizes one or a plurality of signals of the serial signals output from the signal processor of the plurality of sequences.

3. The apparatus according to claim 2, further comprising an error detector that performs an error detection with respect to output signals of the synthesizer, wherein when an error is detected, the synthesizer synthesizes serial signals output from the signal processor of the sequence, which is different from the previous sequence.

4. The apparatus according to claim 3, wherein the synthesizer first outputs serial signals output from one of the signal processors, and synthesizes one of serial signals, which have not been synthesized, with the previously synthesized signals every time that an error is detected by the error detector.

5. The apparatus according to claim 3, further comprising a switch that stops an input of the digital signals with respect to the signal processor of the sequence, which has not been synthesized, when no error is detected by the error detector.

6. An OFDMA signal transmission apparatus comprising:
a plurality of S/P converters that convert serial signals to parallel data;
an IFFT apparatus that performs inverse fast Fourier transformation with respect to the plurality of parallel data output from the S/P converters;
a P/S converter that converts parallel data output from the IFFT apparatus to serial data;
a frequency converter that performs frequency conversion of the serial data;
an adder that adds the frequency converted data and the serial data;
a D/A converter that converts the added data to analog signals; and
an orthogonal modulator that orthogonally modulates the analog signals.

7. An OFDMA signal transmission apparatus comprising:
an orthogonal demodulator that orthogonally demodulates signals received by frequency diversity;
an A/D converter that converts the orthogonally demodulated signals to digital signals;
a frequency converter that divides the digital signals for the respective frequency bands and converts the signals to base band signals of the respective bands;
a low pass filter that limits each band of the base band signals divided for each band;
an S/P converter that converts the respective signals whose bands are limited to parallel signals;
an FFT apparatus that Fourier transforms the respective parallel signals;
a P/S converter that converts the respective signals output from the FFT apparatus to serial signals so as to obtain signals each having a natural frequency; and
a synthesizer that synthesizes the signals of natural frequencies for every plurality of signals so as to obtain a plurality of reception data.

8. An OFDMA signal transmission apparatus comprising:
an orthogonal demodulator that orthogonally demodulates signals received by frequency diversity;
an A/D converter that converts the orthogonally demodulated signals to digital signals;
a frequency converter that divides the digital signals for the respective frequency bands and converts the signals to base band signals of the respective bands;
a low pass filter that limits the respective bands of the base band signals divided for the respective bands;
a synthesizer that synthesizes the respective base band signals whose bands are limited for every plurality of signals;

an S/P converter that converts the respective synthesized signals to parallel signals;

an FFT apparatus that Fourier transforms the respective parallel signals; and a P/S converter that converts the respective signals output from the FFT apparatus to serial signals so as to obtain a plurality of reception data.

9. An OFDM base station apparatus comprising:

an orthogonal demodulator that orthogonally demodulates received signals in which continuous sub-carriers are assigned for each communication terminal apparatus and frequencies of the sub-carriers are different depending on each communication terminal apparatus;

an A/D converter that converts the orthogonally demodulated signals to digital signals;

a frequency converter that converts the digital signals to base band signals for the respective bands;

an S/P converter that converts the respective base band signals to parallel signals;

an FFT apparatus that Fourier transforms the respective parallel signals; and a P/S converter that converts the output signals from the FFT apparatus to serial signals so as to obtain signals each having a natural frequency.

10. An OFDMA signal transmission method comprising:

orthogonally demodulating received signals to which sub-carriers are only assigned at intervals of a power of 2 by OFDMA signal transmission, and thereafter converting the signals to digital signals;

dividing the digital signals at each time;

converting the divided signals to parallel signals;

Fourier transforming the parallel signals;

performing signal processing of a plurality of sequences for converting the parallel signals to serial signals; and synthesizing the serial signals obtained by the signal processing of a plurality of sequences.

11. An OFDMA signal transmission method comprising:

orthogonally demodulating received signals to which sub-carriers are only assigned at intervals of a power of 2 by OFDMA signal transmission, and thereafter converting the signals to digital signals;

dividing the digital signals at each time;

converting the divided signals to parallel signals;

Fourier transforming the parallel signals;

performing signal processing of a plurality of sequences for converting the parallel signals to serial signals;

performing an error detection with respect to any one of the serial signals; and synthesizing one of the serial signals, which has not been synthesized, with the previously synthesized signals when an error is detected.

12. An OFDMA signal transmission method comprising:

converting serial signals to parallel data, and thereafter performing inverse fast Fourier transform with respect to the parallel data;

converting the converted parallel data to serial data, thereafter performing frequency conversion of the serial data;

adding the frequency converted data and the serial data; and converting the added data to analog signals, thereafter orthogonally modulating the analog signals.

13. An OFDMA signal transmission method comprising:

orthogonally demodulating signals received by frequency diversity, and thereafter converting the orthogonally demodulated signals to digital signals;

dividing the digital signals for the respective frequency bands to convert the signals to base band signals of the respective bands;

converting the base band signals to parallel signals, thereafter Fourier transforming the parallel signals;

converting the parallel signals to serial signals so as to obtain signals each having a natural frequency; and synthesizing the signals of natural frequencies every plurality of signals so as to obtain a plurality of reception data.

14. An OFDMA signal transmission method comprising:

orthogonally demodulating signals received by frequency diversity, and thereafter converting the orthogonally demodulated signals to digital signals;

dividing the digital signals for the respective frequency bands to convert the signals to base band signals of the respective bands;

synthesizing the base band signals every plurality of signals, thereafter converting the synthesized signals to parallel signals; and Fourier transforming the respective converted parallel signals, and thereafter converting the parallel signals to serial signals so as to obtain a plurality of reception data.

15. An OFDMA signal transmission method comprising:

making frequencies of sub-carriers different depending on each communication terminal apparatus;

converting serial data to parallel data to be arranged on the frequency of continuous sub-carriers assigned for each communication terminal apparatus, and thereafter performing inverse fast Fourier transform with respect to the parallel data;

converting the transformed parallel data to serial data, and thereafter converting the serial data to analog high frequency signals to be transmitted;

orthogonally demodulating the signals transmitted from each communication terminal in a base station apparatus, and thereafter converting the signals to digital signals;

dividing the digital signals for the respective frequency bands to be converted to base band signals of the respective bands, and thereafter limiting the bands;

converting the respective signals whose bands are limited to parallel signals, and thereafter Fourier transforming in the parallel signals to signals on a frequency axis; and converting the signals on the frequency axis to serial signals to obtain signals of the respective natural frequencies.

* * * * *